United States Patent [19]
Gelb

[11] Patent Number: 5,425,193
[45] Date of Patent: Jun. 20, 1995

[54] FISHING LURE TUNING TOOL

[76] Inventor: Thomas A. Gelb, P.O. Box 653, Milwaukee, Wis. 53201

[21] Appl. No.: 128,305

[22] Filed: Sep. 28, 1993

[51] Int. Cl.⁶ .................... A01K 97/00; B25B 13/00
[52] U.S. Cl. .............................. 43/4; 81/901; 81/124.2; 81/176.2; 72/479
[58] Field of Search ............ 81/901, 488, 124.2, 81/176.1, 176.2, 176.15; 72/479, 477; 140/147, 123; 43/4, 4.5

[56] References Cited

U.S. PATENT DOCUMENTS

| | | | |
|---|---|---|---|
| 295,880 | 3/1884 | Lorillard, Jr. | |
| 693,406 | 2/1902 | Kydd | |
| 841,472 | 1/1907 | Vanderherchen | |
| 855,905 | 6/1907 | Rhoads | |
| 882,937 | 3/1908 | Fegley | 81/901 |
| 985,087 | 2/1911 | Wilson | |
| 2,231,323 | 2/1941 | Cawood | |
| 2,383,573 | 8/1945 | Tomsek | 81/176.15 |
| 2,472,124 | 6/1949 | Randall | 72/479 |
| 2,642,105 | 6/1953 | Alliano | |
| 2,944,363 | 7/1960 | Poe | 43/42.22 |
| 2,990,734 | 7/1961 | Jackson | 29/432 |
| 3,003,277 | 10/1961 | Vann | 43/42.22 |
| 4,034,595 | 7/1977 | Smith | 29/267 |
| 4,125,913 | 11/1978 | Lewis | 81/124.2 |
| 4,487,096 | 12/1984 | Randall | 81/124.2 |
| 4,599,882 | 7/1986 | Herrmann | 72/479 |
| 4,689,881 | 9/1987 | Fall | 29/813 |
| 4,807,388 | 2/1989 | Cribb | 43/42.23 |

FOREIGN PATENT DOCUMENTS

| | | | |
|---|---|---|---|
| 0497969 | 12/1919 | France | 81/176.1 |
| 0824774 | 12/1959 | United Kingdom | 81/901 |

OTHER PUBLICATIONS

"New Lures, What's Hot, and How to Use Them," *Fishing Facts*, 1990 Lifetime Guide pp. 77-84.

*Primary Examiner*—Mark Rosenbaum
*Assistant Examiner*—James Miner
*Attorney, Agent, or Firm*—Lathrop & Clark

[57] ABSTRACT

A stiff lever arm has a tapered end. A slot is located within the tapered end of the lever arm. The slot has dimensions slightly larger than the looped line tie of a lure which allows the line tie to fit within the slot. Once the line tie is engaged within the slot, a manual force applied to the lever arm produces a torque which bends the line tie to the properly tuned position.

4 Claims, 4 Drawing Sheets

FISHING LURE TUNING TOOL

FIELD OF THE INVENTION

This invention relates to fishing equipment in general, and to tools for adjusting lures in particular.

BACKGROUND OF THE INVENTION

Fishing is a sport of increasing popularity and complexity. One of the most popular and effective fishing lures is the crankbait. Crankbaits are fishing lures which have the shape of a bait fish and are designed to move through the water with an action which greatly resembles the movements of a natural bait fish. A properly operating crankbait is called a tuned crankbait. A tuned crankbait vibrates in such a manner that it appears to swim through the water as it is pulled by the fishing line. This natural swimming action is a critical factor in inducing larger species of fish to strike the lure.

Another important feature of crankbaits which makes them appealing to fishermen is that they are designed to run at particular depths of water. For example, deep diving crankbaits are designed to reach depths exceeding 20 feet, mid-range, crankbaits are designed to run from 10 to 20 feet deep and shallow running crankbaits are designed to dive from 0 to 10 feet deep. Therefore, a fisherman can fish a particular layer of water by selecting a crankbait designed to reach the desired depth. This is important because active game fish often suspend at a certain depth of water. In order to catch these fish, the fisherman must select a lure that runs through the zone where the fish are suspended.

In order to successfully use a crankbait, a fisherman must always fish with a tuned crankbait. Due to manufacturing flaws and damage associated with usage, many crankbaits in a fisherman's tackle box are out of tune. An out-of-tune crankbait fails to vibrate in a manner which simulates the natural swimming motion of a bait fish. The out-of-tune crankbait rolls to one side in an unnatural manner when it is pulled through the water. This irregular sideways motion is ineffective at triggering game fish to strike the lure. Additionally, an out-of-tune lure fails to reach the depths which the lure was designed to reach. In fact, during high speed retrieves or trolling an out-of-tune crankbait may actually skip across the surface of the water rather than dive to its designed depth. When this happens, the lure is not seen by active game fish because it fails to enter into their suspension zone. A fish cannot strike a lure if it cannot see it. Therefore, a fisherman's likelihood of catching fish is greatly dependent upon using a precisely tuned lure.

Most crankbaits can be successfully tuned by adjusting the loop of metal which forms the line tie located on the front of the lure. For example, if the crankbait rolls to the left when it is pulled through the water, the lure can be tuned by bending the line tie slightly to the right. In contrast, if the crankbait rolls to the right when it is pulled through the water, the lure can be tuned by slightly bending the line tie to the left. Through trial and error, the line tie is incrementally adjusted until the lure is perfectly in tune.

Presently, most tuning adjustments to the line tie are accomplished though the use of a pliers. However, pliers are difficult to use as tuning instruments for several reasons. First, because line ties extend such a short distance from the surface of the lure, they are very difficult to grip with a pliers. The wide construction of a typical pliers interferes with the surface of the lure. This gripping problem makes it difficult to apply the torque necessary to bend the line tie.

Second, a pliers lacks the precision required to efficiently tune lures. In order to properly tune a lure, it is often necessary to bend the line tie a mere one thousandth of an inch. A person attempting to tune the lure with a pliers must concentrate on gripping the line tie while simultaneously attempting to bend the line tie. This dual effort makes it difficult to bend the line tie the precise amount required to bring the lure back into tune. The lack of precision is intensified by the fact that each time the line tie is adjusted with a pliers, it is gripped in a slightly different location than the previous trial causing the line tie to be bent at varying locations. Each bending location has a slightly different effect on the lure's action. As a result of the lack of bending precision, multiple trials are necessary before the lure is properly tuned which causes the tuning process to become frustrating and time consuming. The excessive number of bending trials also can cause fatiguing of the line tie.

Third, the abrasive texture of many pliers often scratches the line tie. A scratched line tie will fray the attached fishing line when the crankbait is pulled through the water.

What is needed is a lure tuning device which allows an operator to quickly and precisely adjust fishing lure line ties without scratching or fatiguing the line tie.

SUMMARY OF THE INVENTION

The apparatus of this invention is used to tune fishing lures such as crankbaits which have a frontwardly protruding line tie loop. The lure tuning apparatus has a rigid shaft which functions as a lever arm for the application of a bending force. Located at the end of the shaft is a recessed end slot which mates with the line tie loop. When a bending force is applied to the shaft, the mated line tie loop is bent thereby adjusting the tuning of the lure. The lure tuning apparatus also has at least one tapered surface which converges inward toward the recessed end slot to form a tip. The tapered surface provides clearance for bending the line tie loop in close proximity to the lure body.

It is an object of the present invention to provide a lure tuning apparatus that readily engages and bends difficult to access line ties.

It is another object of the present invention to provide a lure tuning apparatus which eliminates the need to grip the line tie while simultaneously making tuning adjustments thereby increasing the degree of tuning precision and minimizing the number of bending trials necessary to tune the lure.

It is an additional object of the present invention to provide a lure tuning apparatus which bends the line tie at the same location each time the line tie is adjusted.

It is also an object of the present invention to provide a lure tuning apparatus which does not scratch the tie line during the tuning process.

Further objects, features and advantages of the invention will be apparent from the following detailed description when taken in conjunction with the accompanying drawings.

DESCRIPTION OF THE PREFERRED EMBODIMENT

Figure 1:
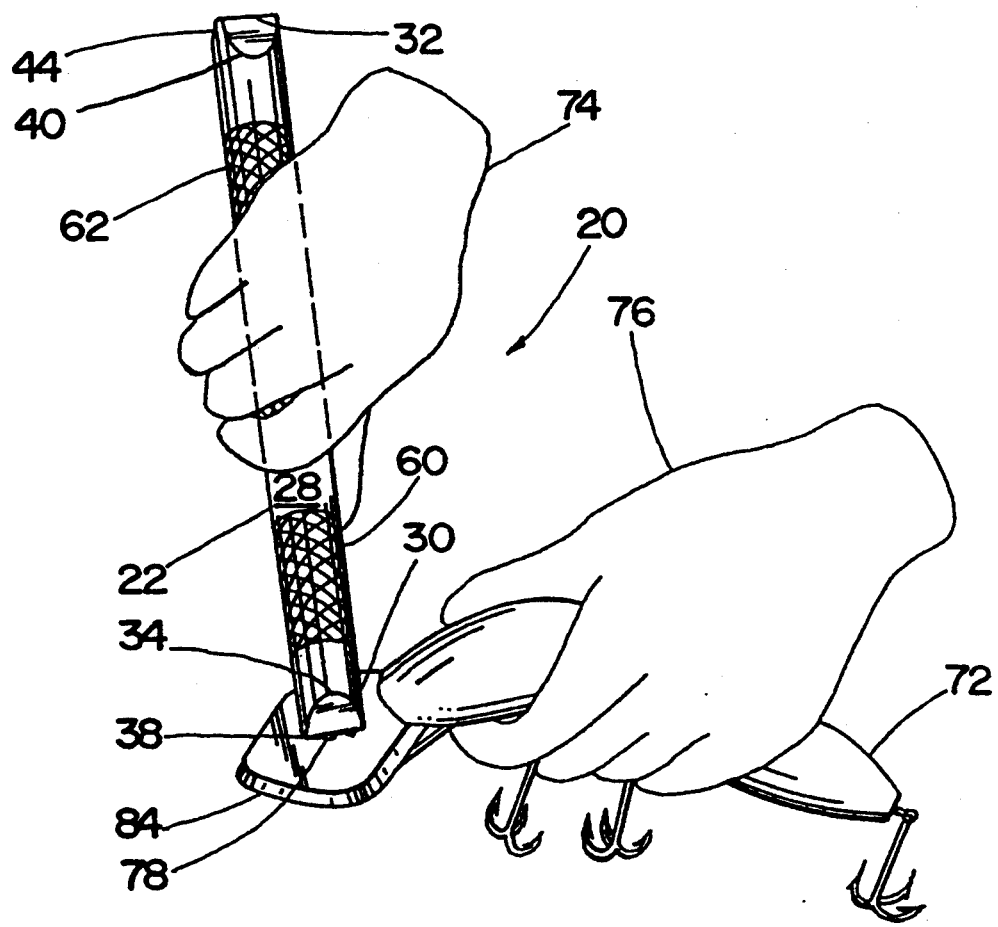
FIG. 1 is an isometric view of a pair of hands employing the lure tuning apparatus of this invention on a crankbait.

Referring more particularly to FIGS. 1-11 wherein like numbers refer to similar parts, a lure tuning apparatus 20 used to adjust a looped line tie 78 of a lure such as a crankbait 72 is shown in FIG. 1. A conventional crankbait lure 72 is occasionally fashioned of wood, but is more commonly formed of molded plastic. Metal loops or eyelets are screwed into or molded integrally with the plastic to provide places of attachment for hooks and fishing line. The forward loop is the line tie 78. The line tie represents the point at which the pulling force of the fishing line is applied to the lure 72. Therefore, the line tie should be properly aligned with respect to the central axis of the lure for best fishing performance.

Figure 2:
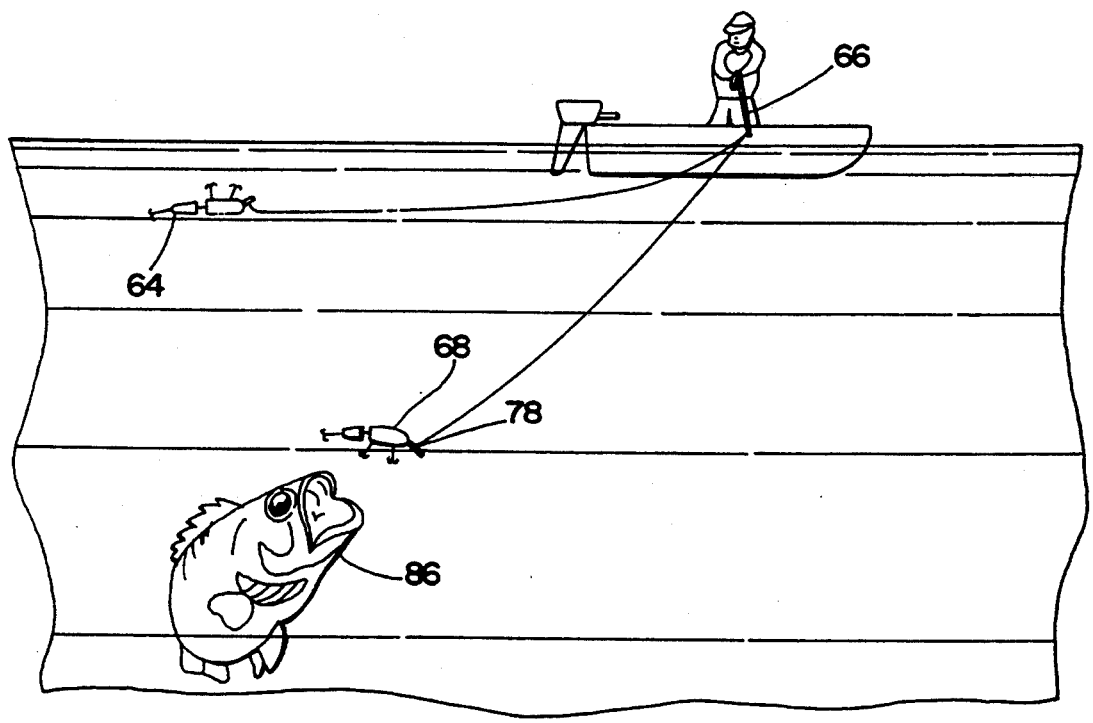
FIG. 2 is a schematic view showing the diving depth of a tuned crankbait in comparison to the diving depth of an out-of-tune crankbait.
Figure 3:
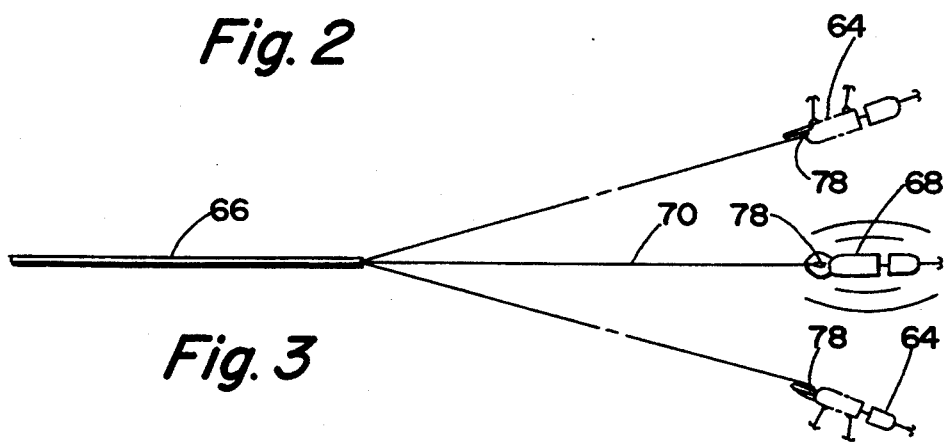
FIG. 3 is a schematic view showing the retrieve line followed by a tuned crankbait in comparison to several out-of-tune crankbaits.
Figure 4:
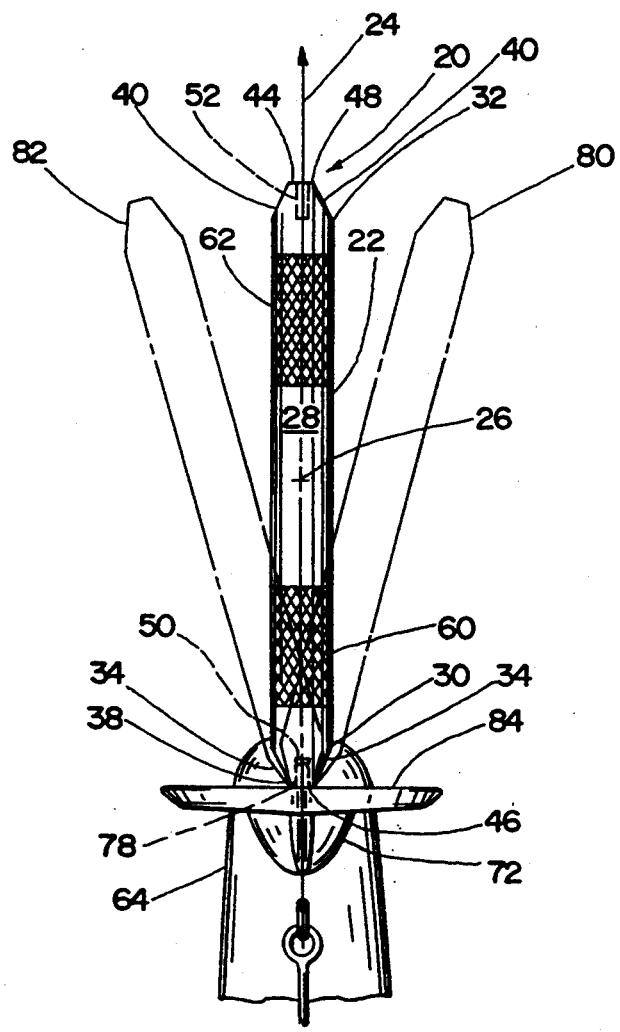
FIG. 4 is a front elevational view of the lure tuning apparatus of FIG. 1 as employed on a typical crankbait, with alternative tool positions shown in phantom view.
Figure 5:
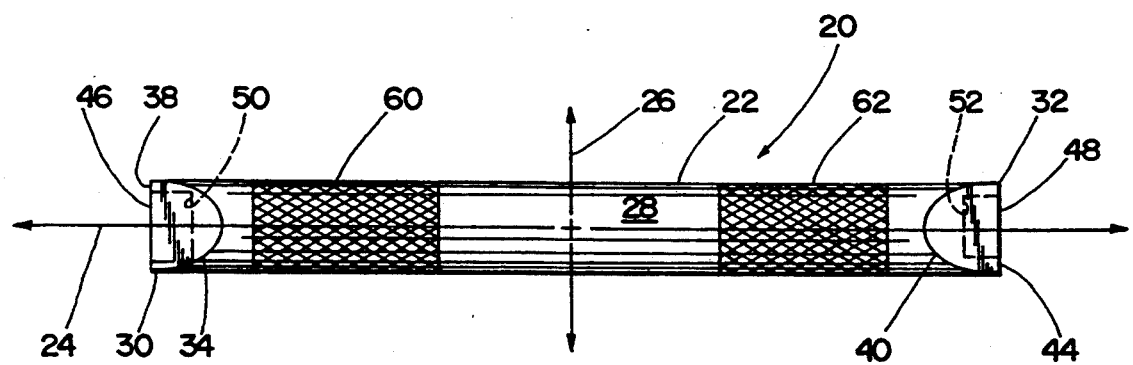
FIG. 5 is a side elevational view of the lure-tuning apparatus of FIG. 1.
Figure 6:
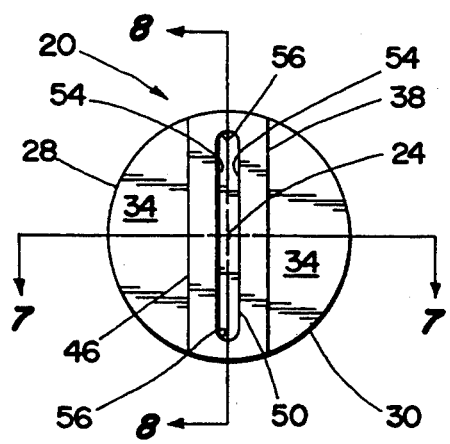
FIG. 6 is a plan view of the first tapered end of the lure tuning apparatus of FIG. 1.
Figure 9:
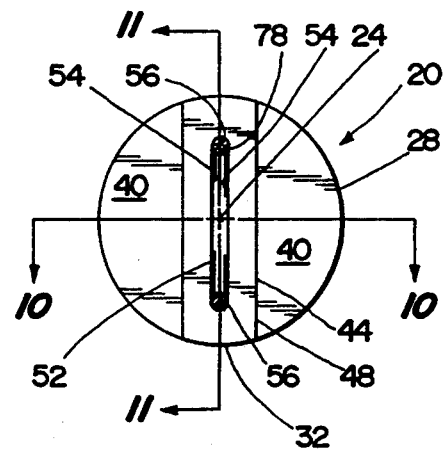
FIG. 9 is a plan view of the second tapered end of the lure tuning apparatus of FIG. 1 with a line tie loop shown inserted in the line tie slot.
Figure 7:
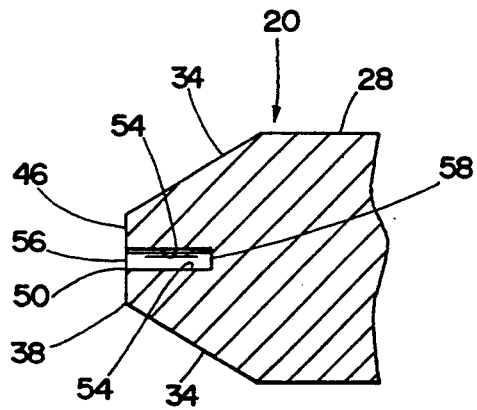
FIG. 7 is a cross-sectional view of the first tapered end of the apparatus of FIG. 6 taken along section line 7—7.
Figure 10:
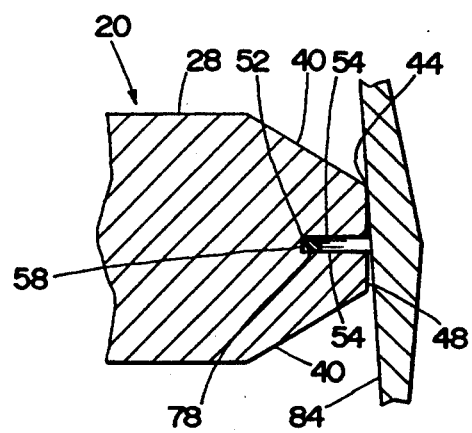
FIG. 10 is a cross-sectional view of the second tapered end of the apparatus of FIG. 9 taken along section line 10—10 shown bending a line tie loop which is inserted in the line tie slot.
Figure 8:
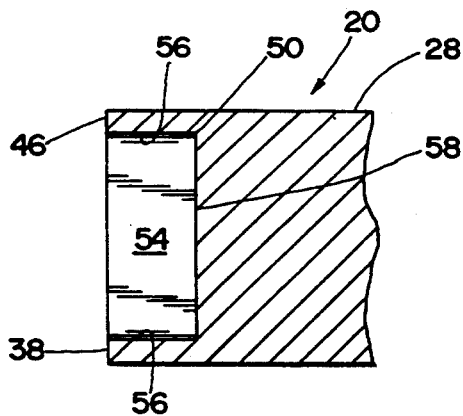
FIG. 8 is a cross-sectional view of the first tapered end of the apparatus of FIG. 6 taken along section line 8—8.
Figure 11:
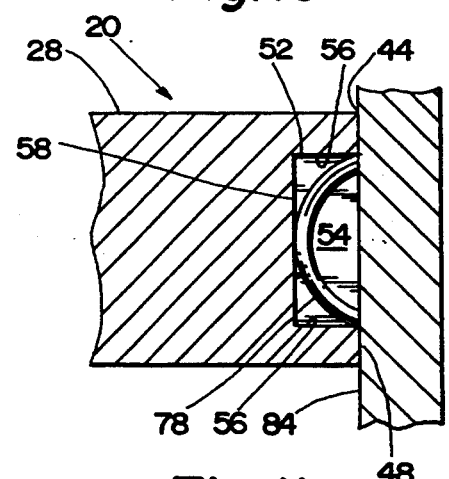
FIG. 11 is a cross-sectional view of the second tapered end of the apparatus of FIG. 9 taken along section line 11—11 with a line tie loop inserted in the line tie slot.

A crankbait 72 in which the looped line tie 78 is properly aligned with the central axis of the lure 72 is called a tuned crankbait 68. When pulled through the water by a line passing through a fishing rod shaft 66, a tuned crankbait 68 will follow a straight line 70 established by the fishing rod shaft 66 as shown in FIG. 3. Furthermore, as shown in FIG. 2, when pulled through the water, a tuned crankbait 68 vibrates with a natural swimming action that induces game fish 86 to instinctively strike the lure. Additionally, the tuned crankbait 68 reaches the maximum depths for which the lure was designed to dive.

A crankbait 72 in which the looped line tie 78 is improperly aligned with respect to the central axis of the lure 72 is called an out-of-tune crankbait 64. If the looped line tie 78 is improperly aligned with respect to the central axis of the lure 72, the fishing line pulling force is not balanced by the resistance of the lure 72. When pulled through the water by a line passing through a fishing rod shaft 66, the unbalanced force causes the out-of-tune crankbait 64 to run to the left or to the right of the straight line 70 established by the rod shaft as shown in FIG. 3. In contrast to the properly tuned crankbait 68, an improperly tuned crankbait 64 performs poorly in fishing because it fails to vibrate in a manner that induces game fish 86 to strike the lure and also fails to reach the lure's designed running depth.

The lure tuning apparatus 20 of this invention is a unitary tool which has a shaft which defines a cylindrical lever arm 22. Axially extending slots 50, 52 are formed in the ends of the arm which are sized to engage the protruding looped metal line ties 78 of a fishing lure. The tool 20 permits the convenient and accurate bending adjustment of lure line ties to tune the lure so that it will run true. By bending the looped line tie 78 sidewardly of the lure central axis, the point of fishing line pulling force application is shifted to the proper alignment with respect to the central axis thereby causing the lure to run true.

The cylindrical lever arm 22 has a parallel central axis 24 which passes through the length of the lever arm 22 and intersects with a perpendicular central axis 26. The tuning apparatus 20 is composed of heat treated free machining steel in order to give the lever arm 22 a high bending strength. The cylindrical lever arm surface 28 is preferably finished with nickel-phosphorous plating in order to resist corrosion.

The tuning apparatus 20 has a first tapered end 30 and a second tapered end 32 which are generally symmetrical to one another about the perpendicular axis 26 of the lever arm 22. As shown in FIGS. 5-8, the first tapered end 30 is comprised of two first parabolic inclined surfaces 34 which oppose each other and are angled inward from the cylindrical lever arm surface 28 toward the parallel central axis 24. The opposing first parabolic inclined surfaces 34 converge as they extend away from the perpendicular central axis 26 of the lever arm 22 to form a first tip 38. In the same manner, as shown in FIGS. 5, and 9-11, the second tapered end 32 is comprised of two second parabolic inclined surfaces 40 which oppose each other and are angled inward from the cylindrical lever arm surface 28 toward the parallel central axis 24. The opposing second parabolic inclined surfaces 40 converge as they extend away from the perpendicular central axis 26 of the lever arm 22 to form a second tip 44.

At the first tip 38, located between the converging first parabolic inclined surfaces 34, is a first planar tip surface 46 having a generally rectangular shape. At the second tip 44, located between the converging second parabolic inclined surfaces 40, is a second planar tip surface 48 having a generally rectangular shape. Both planar tip surfaces 46, 48 have an alignment which is perpendicular to the parallel central axis 24.

Machined into the first planar tip surface 46 is a first slot 50 having a generally rectangular shape. A second slot 52 having a generally rectangular shape is machined into the second planar tip surface 48. In an exemplary tool 20, the first slot 50 has a width of 0.063 inches, a length of 0.203 inches and a depth of 0.156 inches and is larger than the second slot 52 which has a width of 0.047 inches, a length of 0.187 inches and a depth of 0.110 inches. By utilizing two different sized slots 50, 52, the tuning apparatus 20 can tune approximately ninety percent of the crankbaits currently on the market. It should be noted that slots of different sizes may be provided to accommodate crankbaits with different sized line ties.

Both slots 50, 52 have the same alignment about the parallel central axis 24 as their corresponding rectangular planar tip surfaces 46, 48. Each slot 50, 52 is comprised of two parallel rectangular line tie engaging surfaces 54 which are connected by two opposed radial line tie engaging surfaces 56. The line tie engaging surfaces 54, 56 are perpendicular to their corresponding planar tip surfaces 46, 48 and extend inward from the corresponding planar tip surfaces 46,48 towards the perpendicular central axis 26. Each slot also has a generally rectangular inner line tie resting surface 58 which is perpendicular to the parallel central axis 24 and adjoins the line tie engaging surfaces 54, 56.

A first gripping band 60 is located adjacent to the first tapered end 30 of the tuning apparatus 20 while a second gripping band 62 is located adjacent to the second tapered end 32 of the tuning apparatus 20. The gripping bands 60, 62 are roughened portions of the tool shaft formed, for example, by a twenty-four point diamond knurl pattern which is machined into the cylindrical lever arm surface 28. Due to the high coefficient of friction of the gripping bands 60, 62, the tuning apparatus 20 can be manually operated with minimal slippage. With the exception of the gripping bands 60, 62, all edges and surfaces of the tuning apparatus 20 are preferably polished smooth in order to minimize scratching of the crankbait 72 line tie 78.

FIG. 1 shows the lure tuning apparatus 20 as it is used to tune a crankbait 72. The lure tuning apparatus 20 is grasped in a first hand 74 while the crankbait 72 is grasped in a second hand 76. Depending on the size of the crankbait line tie 78, either the first line tie slot 50 or the smaller second line tie slot 52 is placed over the line tie 78. Once the appropriately sized line tie slot 50, 52 is placed over the line tie 78, the first hand 74 applies a force to the lever arm 22 which causes the line tie slot 50, 52 to exert a bending force upon the line tie 78. The tool 20 is bent about an axis generally perpendicular to the central axis of the lever arm 22. If the improperly tuned lure 64 runs left, the line tie 78 is bent right as shown by a first phantom tuning apparatus 80 in FIG. 4. If the improperly tuned lure runs right, the line tie 78 is bent left as shown by a second phantom tuning apparatus 82 in FIG. 4.

In cases where the line tie 78 protrudes a shorter distance above the lure surface 84 than the depth of the line tie slot 50, 52, the corresponding planar tip surface 46, 48 will engage the lure surface. Under these circumstances, the corresponding tapered end 30, 32 allows the line tie 78 to be bent despite its close proximity to the lure surface 84. In the alternative case where the line tie 78 protrudes a greater distance above the lure surface 84 than the depth of the mating line tie slot 50, 52, the line tie 78 will engage the line tie resting surface 58. This increases tuning precision by insuring that the line tie 78 will be bent at the same location for each bending trial.

It should be noted that the tool may be other than cylindrical, for example polygonal, or some other effectively-gripped shape. Furthermore, although two slots have been illustrated, a tool with only a single slot and a single tapered end may be provided.

An alternative embodiment of this invention is a lure tuning apparatus having a lever arm with multiple tapered ends with each tapered end having a differently sized slot. Another alternative embodiment of this invention has a plurality of lever arms each joined together radially about a center to form spokes. At the end of each lever arm is a tapered end with each tapered end having a differently sized slot. Finally, the material composition of this invention is not confined to machining steel but could be composed of wood, plastic or other metals, so long as the material is of sufficient stiffness to bend a line tie.

It is understood that the invention is not confined to the particular construction or arrangement of parts herein illustrated and described, but embraces such modified forms thereof as come within the scope of the following claims.

I claim:

1. A tool for tuning a fishing lure having a body with a frontwardly protruding line tie loop, the tool comprising:
   a) a rigid shaft which defines a lever arm for application of bending force;
   b) portions of the shaft which define a recessed end slot which has two parallel line tie loop engaging surfaces which extend axially along the shaft, and wherein the slot extends uninterrupted from one side of the shaft to another, and wherein the slot engages the line tie loop, and wherein portions of the shaft define at least one side line tie loop engaging surface which is perpendicular to the line tie loop engaging surfaces and which restricts sideward displacement of the tool with respect to an engaged line tie loop, wherein application of bending force to the shaft bends the line tie loop to adjust the tuning of the lure;
   c) portions of the lever arm defining at least one tapered planar surface converging inward towards the end slot to form a tip, said tapered surface providing clearance for bending of the loop in close proximity to the lure body, wherein the end slot has two parallel line tie loop engaging surfaces which extend axially along the shaft approximately the same length, and wherein the tapered surface adjacent the slot is at least as wide as the slot.

2. An apparatus for adjusting fishing lures having a protruding loop for the attachment of a fishing line thereon, the apparatus comprising:
   a) a rigid shaft which defines a central axis;
   b) portions of the shaft which define a tapered end having two inclined planar surfaces converging inward toward the central axis;
   c) portions of the shaft which define a slot which is recessed within the shaft and extends generally along the central axis, wherein the slot has two parallel line tie loop engaging surfaces which extend uninterrupted from one side of the shaft to another, and wherein the width of the slot is less than the axial depth of the slot, and wherein portions of the shaft define at least one side line tie loop engaging surface which is perpendicular to the line tie loop engaging surfaces and which restricts sideward displacement of the tool with respect to an engaged line tie loop, and wherein the slot engages with the protruding loop and rotation of the shaft about an axis perpendicular to the central axis causes the bending of the loop along an axis defined by the shaft end to facilitate adjustment of the lure for running in tune.

3. A tool for tuning a fishing lure having a body with a frontwardly protruding line tie loop, the tool comprising:
   a) a rigid shaft which defines a lever arm for application of bending force;
   b) portions of the shaft which define a recessed end slot which has two parallel line tie loop engaging surfaces which extend axially along the shaft, and wherein the slot extends uninterrupted from one side of the shaft to another, and wherein the slot engages the line tie loop, and wherein portions of the shaft define side line tie loop engaging surfaces which are perpendicular to the line tie loop engaging surfaces and which restrict sideward displacement of the tool with respect to an engaged line tie loop, and wherein application of bending force to the shaft bends the line tie loop to adjust the tuning of the lure; and
   c) portions of the lever arm defining at least one tapered planar surface converging inward towards the end slot to form a tip, said tapered surface providing clearance for bending of the loop in close proximity to the lure body.

4. A fishing lure tuning assembly comprising:
   a) a fishing lure having a body with a frontwardly protruding line tie loop;
   a) a rigid shaft which defines a lever arm for application of bending force;
   b) portions of the shaft which define a recessed end slot engaged with the line tie loop, wherein application of bending force to the shaft bends the engaged line tie loop to adjust the tuning of the lure; and
   c) portions of the lever arm defining at least one tapered surface converging inward towards the end slot to form a tip, said tapered surface providing clearance for bending of the loop in close proximity to the lure body.

* * * * *